United States Patent [19]
Yoshida

[11] Patent Number: 5,724,183
[45] Date of Patent: Mar. 3, 1998

[54] LIGHT GATHERING APPARATUS

[75] Inventor: Kazushi Yoshida, Shizuoka-ken, Japan

[73] Assignee: Asahi Kogaku Kogyo Kabushiki Kaisha, Tokyo, Japan

[21] Appl. No.: 187,140

[22] Filed: Jan. 27, 1994

Related U.S. Application Data

[62] Division of Ser. No. 679,271, Apr. 2, 1991, abandoned.

[30] Foreign Application Priority Data

Apr. 5, 1990 [JP] Japan .................... 2-91233

[51] Int. Cl.$^6$ .................... G02B 5/30; G02B 27/14; G02B 27/28
[52] U.S. Cl. .................... 359/487; 359/495; 359/627; 359/857; 353/99; 362/297; 362/301; 362/346
[58] Field of Search .................... 359/529, 530, 359/546, 850, 851, 857, 618, 627, 487, 494, 495, 833, 496, 834; 353/37, 81, 98, 99; 362/297, 301, 346

[56] References Cited

U.S. PATENT DOCUMENTS

| | | | |
|---|---|---|---|
| Re. 18,166 | 8/1931 | Stimson | 359/530 |
| 3,399,592 | 9/1968 | Brachvogel et al. | 359/618 |
| 4,127,771 | 11/1978 | Sick | 359/855 |
| 4,641,926 | 2/1987 | Shirasaki | 359/487 |
| 4,659,185 | 4/1987 | Aughton | 359/487 |
| 4,712,867 | 12/1987 | Malek | 359/530 |
| 4,850,686 | 7/1989 | Morimoto et al. | |
| 4,856,884 | 8/1989 | Fender et al. | 359/618 |
| 4,868,377 | 9/1989 | Nishikawa | |
| 4,948,233 | 8/1990 | Maruyama | |
| 4,953,950 | 9/1990 | Arata et al. | 359/618 |
| 4,989,948 | 2/1991 | Dreyer, Jr. | 359/850 |
| 5,042,921 | 8/1991 | Sato et al. | 359/40 |
| 5,046,795 | 9/1991 | Morimoto et al. | |
| 5,054,885 | 10/1991 | Melby | 359/618 |
| 5,067,782 | 11/1991 | Morimoto et al. | |
| 5,073,830 | 12/1991 | Loucks | 359/495 |
| 5,124,841 | 6/1992 | Oishi | 359/495 |
| 5,194,981 | 3/1993 | Morimoto | |
| 5,231,433 | 7/1993 | Yoshida et al. | 353/37 |

OTHER PUBLICATIONS

Nikkei, Oct. 30, 1989, p. 76.

*Primary Examiner*—Ricky D. Shafer
*Attorney, Agent, or Firm*—Greenblum & Bernstein P.L.C.

[57] ABSTRACT

A light gathering apparatus for gathering luminous fluxes incident from two different directions, including a luminous flux gathering optical element which includes an array of continuous first and second reflection or emission surfaces alternately and symmetrically arranged with respect to bisectors of the angle defined by and between the luminous fluxes.

13 Claims, 7 Drawing Sheets

LIGHT GATHERING APPARATUS

This application is a division of application Ser. No. 07/697,271, filed Apr. 2, 1991, now abandoned.

BACKGROUND OF THE INVENTION

1. Field of the Invention

The present invention relates to an apparatus for gathering light fluxes incident from different directions to emit light flux in a predetermined single direction, and more particularly relates to a gathering apparatus which gathers and emits light fluxes of the same polarization.

2. Description of Related Art

Figure 10:
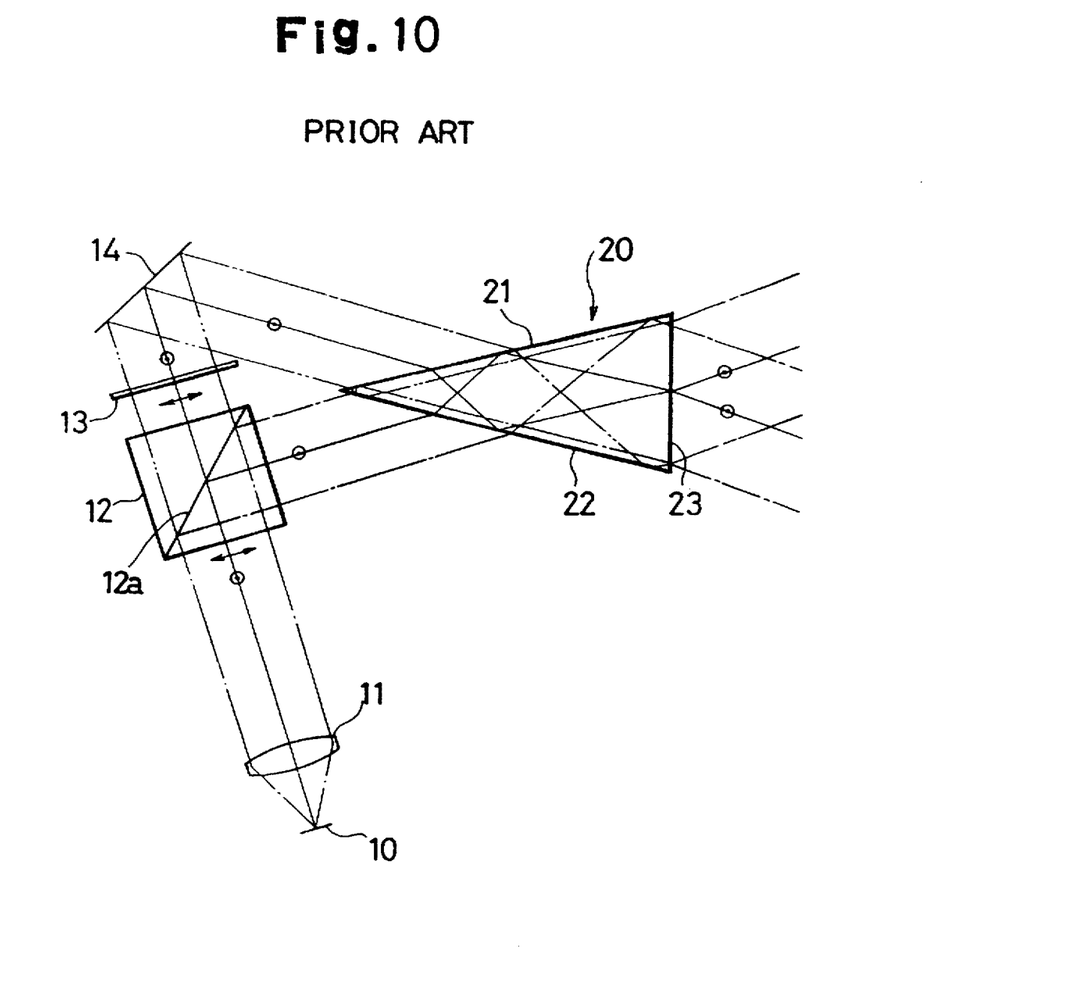

A known light gathering apparatus for collecting light fluxes incident from different directions, as shown in FIG. 10 includes a polarization beam splitter 12 which splits a light flux which is emitted from a light source 10 and collimated by a collimating lens 11 into two linear polarization components. Wedge-shaped prism 20 gathers the split beams without regard to their polarization.

Among the light fluxes incident upon the polarization beam splitter 12 is a P-polarized beam component which has an oscillation direction of electromagnetic vector parallel to the plane of the drawing. It is transmitted through a connecting surface 12a of the polarization beam splitter 12 and transmitted through a λ/2 plate 13 where the oscillation direction is converted to be perpendicular to the plane of the drawing (shown as two-dotted and dashed lines in FIG. 10). The light is then reflected by a mirror 14 to be incident upon the first face 21 of the wedge-shaped prism 20.

On the other hand, an S-polarized beam component which has an oscillation direction perpendicular to the plane of the drawing is reflected by the connecting surface 12a of the polarization beam splitter 12 and is made incident upon a second face 22 of the wedge-shaped prism 20 (shown as dotted and dashed lines).

The light fluxes are refracted upon incidence of the wedge-shaped prism 20 at the first face 21 and the second face 22 thereof, and then totally reflected by the internal surfaces of the first and second faces 21 and 22, respectively. The reflected light fluxes are emitted from a third face 23 of the wedge-shaped prism 20.

In the conventional arrangement shown in FIG. 10, only linearly polarized light of predetermined direction is selectively collected from all of the polarizations existing in natural light and is emitted.

In the known light gathering apparatus as shown in FIG. 10, the gathered light fluxes of two different directions are emitted from the same outgoing surface (third face) 23 of the wedge-shaped prism 20, but there is a difference in the emission angles between the outgoing lights from the third face 23. This results in an increase of irregularity of luminance, depending upon the distance of the object to be illuminated from the outgoing face 23. Furthermore, in the known light gathering apparatus mentioned above, it is necessary to use a projection lens which has a small F-number, i.e., a projection lens of a large diameter in order to decrease the loss of quantity of light. However, generally speaking, it is very difficult to realize such a projection lens.

SUMMARY OF THE INVENTION

The primary objective of the present invention is to provide a light gathering apparatus which will emit a substantial portion of the gathered light in the same direction.

To achieve the objective mentioned above, according to the present invention, there is provided a light gathering apparatus for gathering luminous fluxes incident from two different directions. The apparatus comprises a luminous flux gathering optical element including an array of continuous first and second reflection or emission surfaces which are alternately and symmetrically arranged with respect to bisectors of an angle defined by and between the luminous fluxes.

In an embodiment of the present invention, the luminous flux gathering optical element is realized by a mirror including an array of continuous first and second reflection surfaces which are alternately arranged to reflect the multifariously incident luminous fluxes in the same direction.

In another embodiment of the present invention, the luminous flux gathering optical element is realized by a composite prism having a flat incident surface on which the luminous fluxes are made incident from the different directions, and an array of continuous first and second emission surfaces which are alternately arranged to refract the incident luminous fluxes in the same direction.

The present disclosure relates to subject matter contained in Japanese patent application No. 02-91233 (filed on Apr. 5, 1990) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENTS

FIGS. 1 through 4 show a first embodiment of the present invention, in which a light gathering apparatus is comprised of a light gathering mirror 30 having a plurality of mirror elements 30a made of continuous triangular posts with apex angles of 120 degrees.

Figure 1:
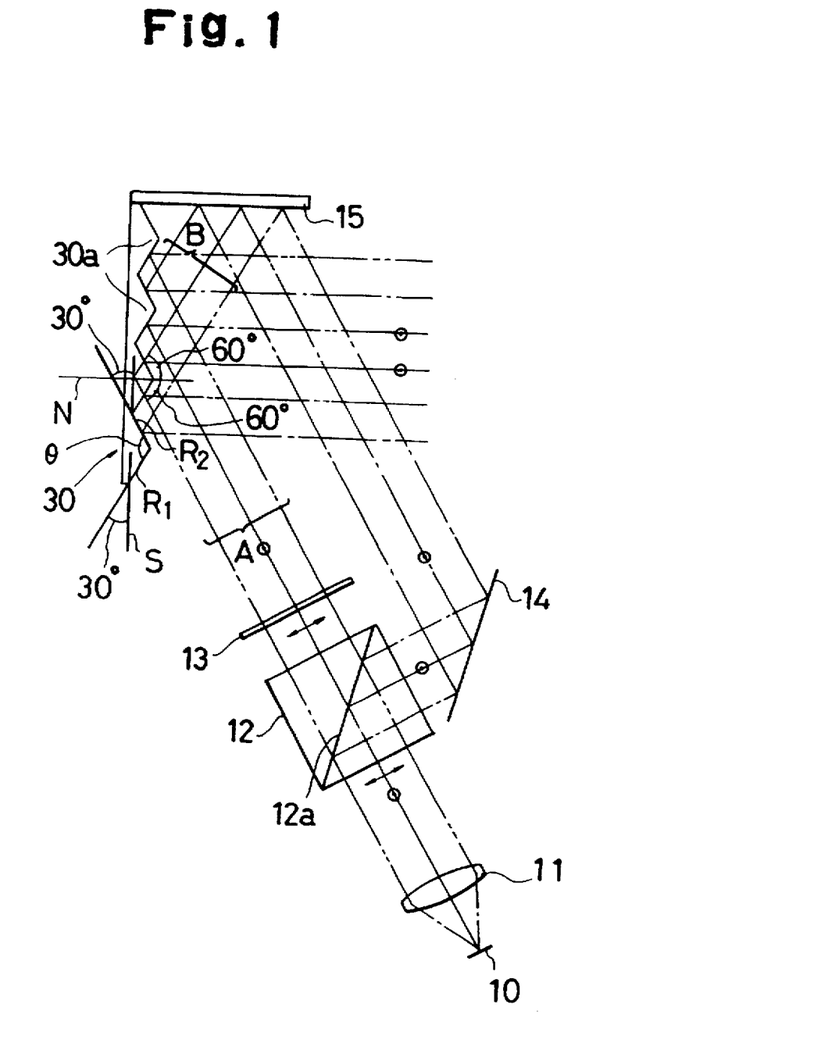
FIG. 1 is a schematic diagram showing the optical path of a light gathering apparatus according to a first embodiment of the present invention.

FIG. 1 shows a light source apparatus using the light gathering mirror 30 (light gathering apparatus) by way of example. The light source apparatus includes a light source 10, a collimating lens 11, a polarization beam splitter 12, a λ/2 plate 13, two mirrors 14 and 15, and a light gathering mirror 30. A light flux diffused from the light source 10, including all Polarizations,is collimated by the collimating lens 11 and is then split by the polarization beam splitter 12 into a P-polarized wave component and an S-polarized wave component. The P-polarized wave component transmitted through the polarization beam splitter 12 is made incident upon the light gathering mirror 30 through the λ/2 plate 13

(shown as two-dotted and dashed lines in FIG. 1). On the other hand, the S-polarized wave component which is reflected by the connecting surface 12a of the polarization beam splitter 12 is made incident upon the light gathering mirror 30 from a direction opposite to that of the P-polarized wave component through the mirrors 14 and 15 (shown as dotted and dashed lines).

The apex angle of the reflection surfaces R1 and R2 of each mirror element 30a (triangular post) of the light gathering mirror 30 is 120 degrees. The bisectors of the apex angles of the mirror elements 30a must be parallel to each other and perpendicular to the reference surface S (see FIG. 2). In the illustrated embodiment, the reflection surfaces R1 and R2 have the same length and accordingly the inclination angles of the reflection surfaces R1 and R2 are 30 degrees with respect to the reference surface S. However, the reflection surfaces R1 and R2 may vary in length, resulting in a jagged array of peaks (triangular posts). The light flux A (corresponding to the P-polarized wave component, transmitted through the polarization beam splitter 12), and the light flux B (corresponding to the S-polarized wave component, reflected by the connecting surface 12a of the polarization beam splitter 12), and the mirrors 14 and 15 are made symmetrically incident upon the mirror elements 30a from the opposite sides at an incident angle of 60 degrees with respect to lines N normal to the reference surface S of the light gathering mirror 30. Thus, according to the present invention, all of the light fluxes (i.e., the light fluxes A and B incident upon the light gathering mirror 30) are reflected by the light gathering mirror 30 in a direction perpendicular to the reference surface S.

Figure 2:
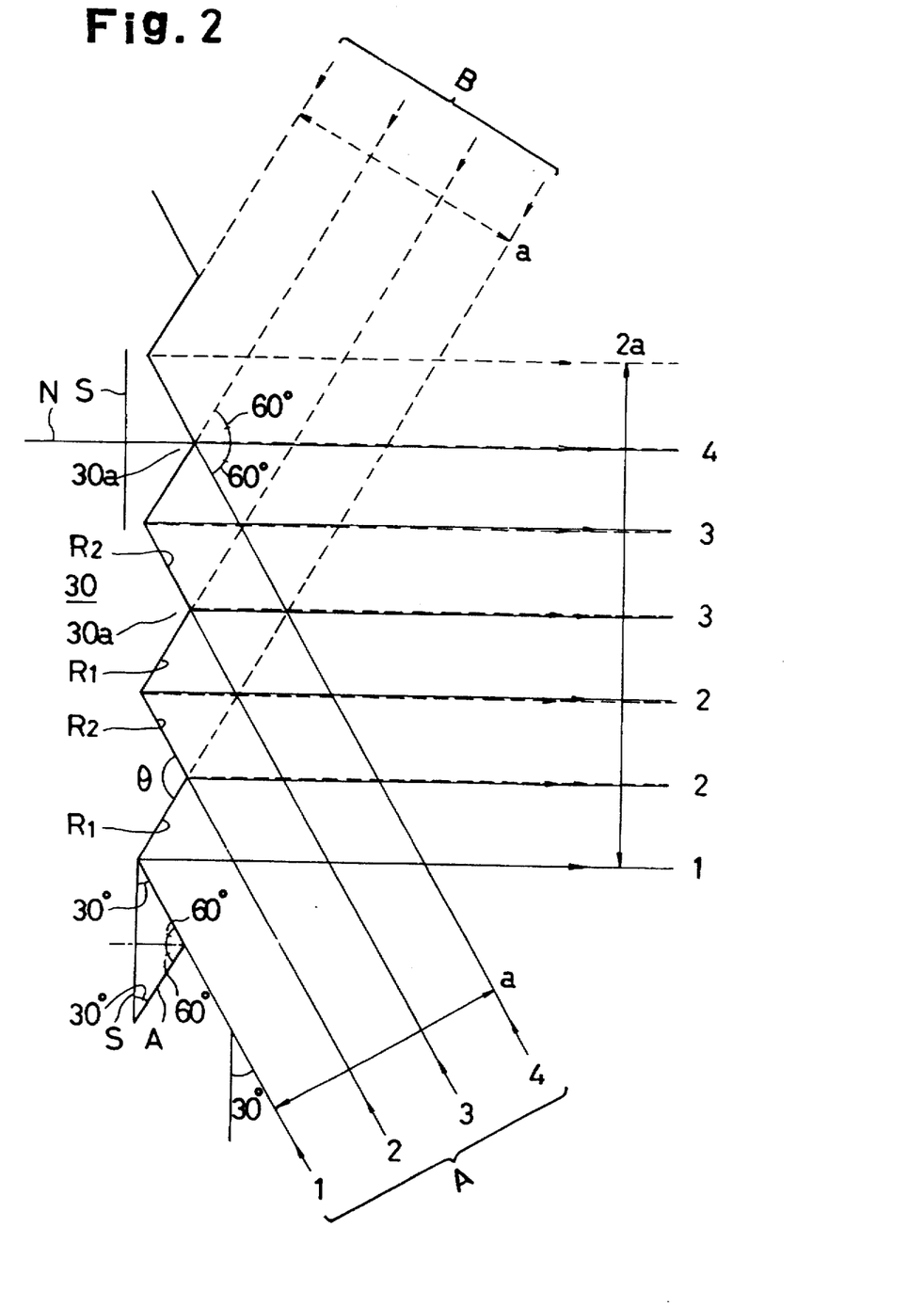
FIG. 2 is a diagram showing the optical path of a light gathering mirror shown in FIG. 1.

FIG. 2 shows an enlarged view of the reflection surfaces R1 and R2 of the mirror elements 30a of the light gathering mirror 30. The light flux A from one side is totally reflected by all the reflection surfaces R1, as shown by solid lines, so that a parallel light flux perpendicular to the reference surface S is obtained. On the other hand, the light flux B from the other side is totally reflected by all the reflection surfaces R2, as shown by imaginary lines, so that a parallel light flux perpendicular to the reference surface S is obtained.

The reflected parallel light flux includes,in equal proportions, the component from the reflection surfaces R1 and the component from the reflection surfaces R2. In FIG. 2, the reflected lights of the fluxes A and B are designated by numerals 1, 2, 3 and 4 to show the collection of the lights. As can be seen from FIG. 2, there is no substantial irregularity of illumination light (luminance) and the reflected lights have the same direction.

Supposing that the light fluxes A and B are both defined by a circle of a diameter a, the resultant light flux reflected by the light gathering mirror 30 is in the shape of an ellipse having a major diameter of 2a and a minor diameter of a. Such an elliptical light flux can be shaped into a circular light flux, if necessary. Or, the elliptical light flux can be advantageously used for a rectangular image forming system. Namely, since an image plane is usually rectangular, such as a television or a photographic film or the like, such a rectangular image plane can be effectively illuminated with the elliptical light flux.

The optimum apex angle of the mirror element 30a defined by the adjacent reflection surfaces R1 and R2 is 120 degrees, as mentioned above to ensure a uniform luminance and the same emission direction of the illumination light flux. Namely, the optimum apex angle of the mirror element 30a defined by the adjacent reflection surfaces R1 and R2 is 120 degrees.

Figure 3:
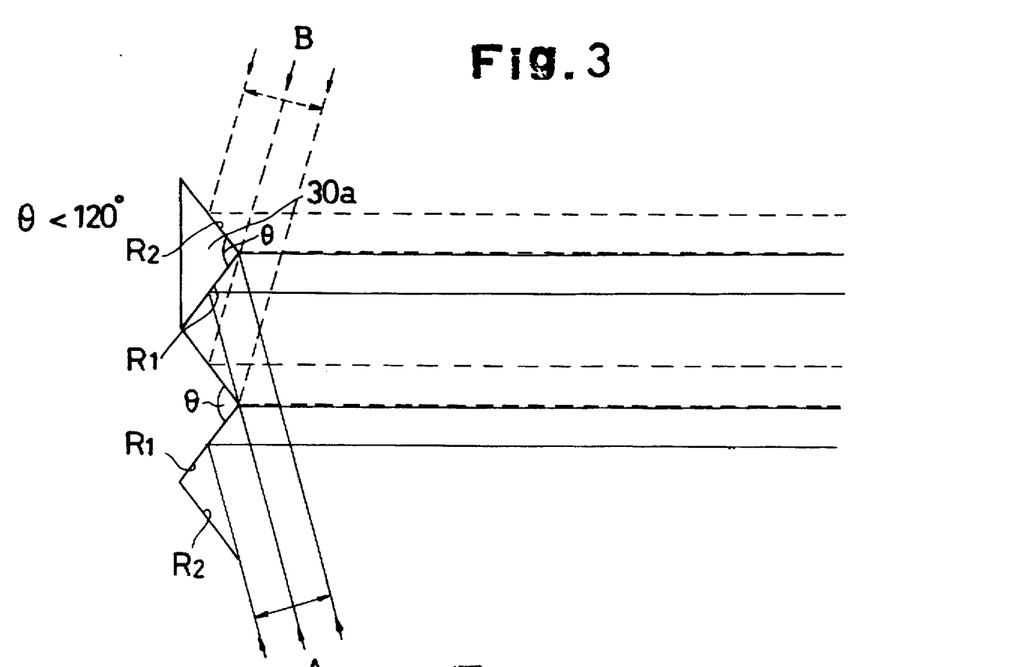
FIGS. 3 and 4 are diagrams of optical paths of light gathering mirrors which have different apex angles.

If the apex angle $\theta$ of the mirror element 30a (the triangular post) is smaller than 120 degrees, the reflection surfaces R1 and R2 can not be wholly used as reflection surfaces when the light fluxes A and B are made incident upon the reflection surfaces R1 and R2 from the opposite directions so as to obtain a resultant parallel light flux reflected from the light gathering mirror 30 in the same direction, as shown in FIG. 3. In other words, only parts of the respective reflection surfaces R1 and R2 can be used to obtain a parallel light flux emitted from the light gathering mirror 30 in the same direction. Consequently, there are areas in which no light flux exists, resulting in an increased irregularity of luminance on the object (not shown) to be illuminated. The irregularity can be reduced, to some extent, by making the light fluxes A and B incident upon the respective reflection surfaces R1 and R2 primarily parallel to the associated reflection surfaces R1 and R2, if it is permissible that the emission direction of the light flux reflected by the reflection surfaces R1 is slightly different from that of the light flux reflected by the reflection surfaces R2.

Figure 4:
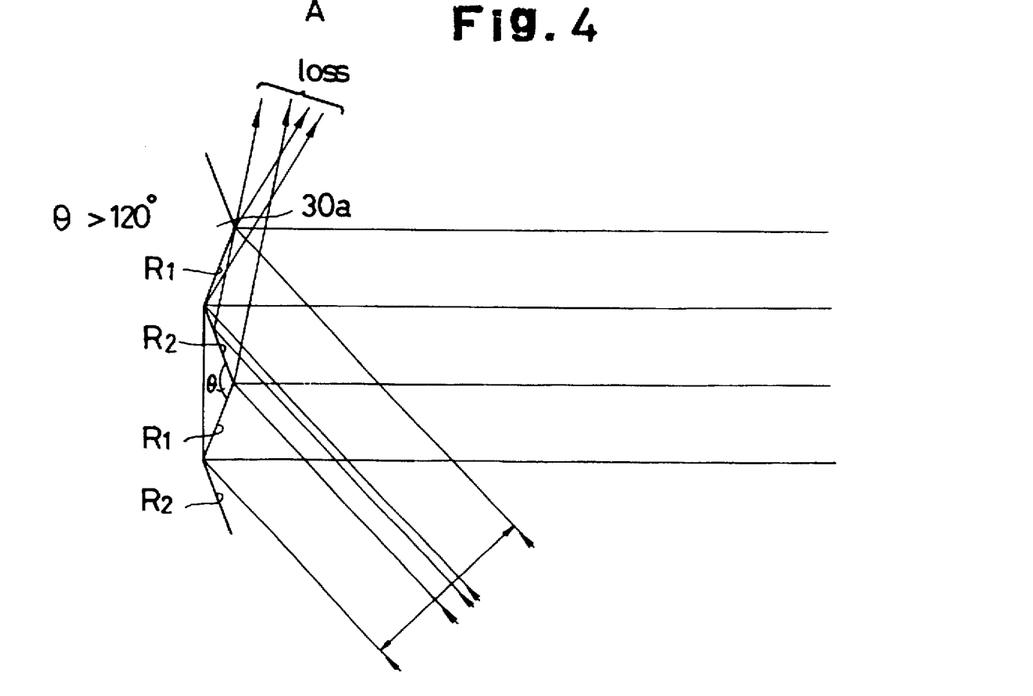

Conversely, if the apex angle $\theta$ is larger than 120 degrees, although there is little or no irregularity of luminance, a part of the light flux which is to be reflected by the reflection surfaces R1 is reflected by the reflection surfaces R2 and deviates from the optical path, as can be seen in FIG. 4. This increases the loss in the quantity of light.

FIGS. 5 through 8 show a second embodiment of the present invention.

Figure 5:
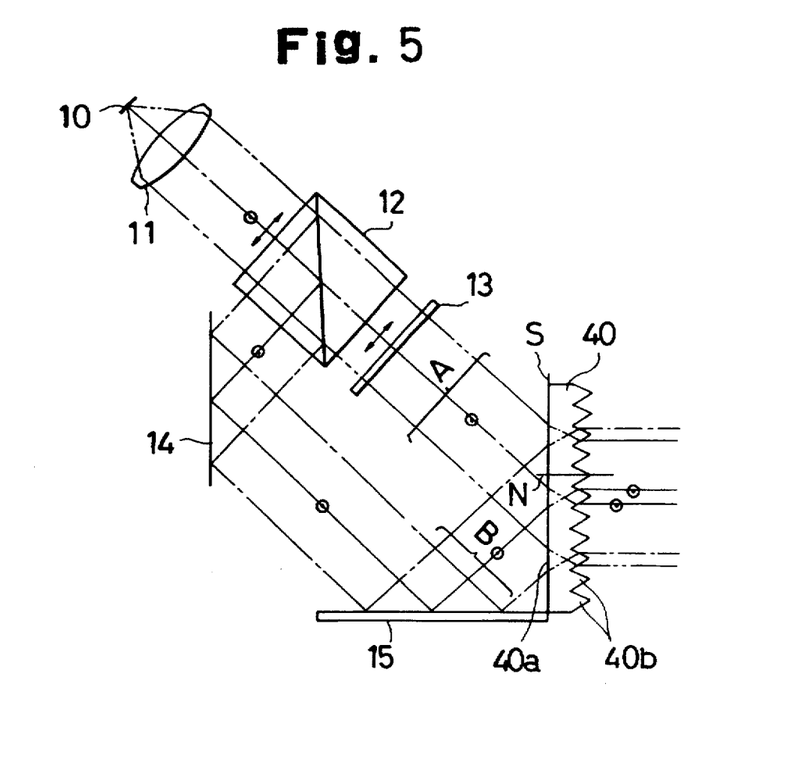
FIG. 5 is a schematic diagram showing an optical path of a light gathering apparatus according to a second embodiment of the present invention.

In this embodiment a composite prism 40 is used instead of the light gathering mirror 30 as in the first embodiment. The light fluxes of the same polarization direction incident from two different directions are emitted from the composite prism 40 in the same direction by refraction rather than reflection. The composite prism 40 has a flat incident surface 40a (reference surface S) and a serrated outgoing surface (emission surface) 40b in cross section, made of continuous triangular posts. The light fluxes from two different directions are made symmetrically incident (having the same angle of incidence) upon the surface 40a of the composite prism 40 but in different directions with respect to the bisectors N of the apexes of the triangular posts 40b. The remaining construction is the same as that of the first embodiment shown in FIG. 1.

Figure 6:
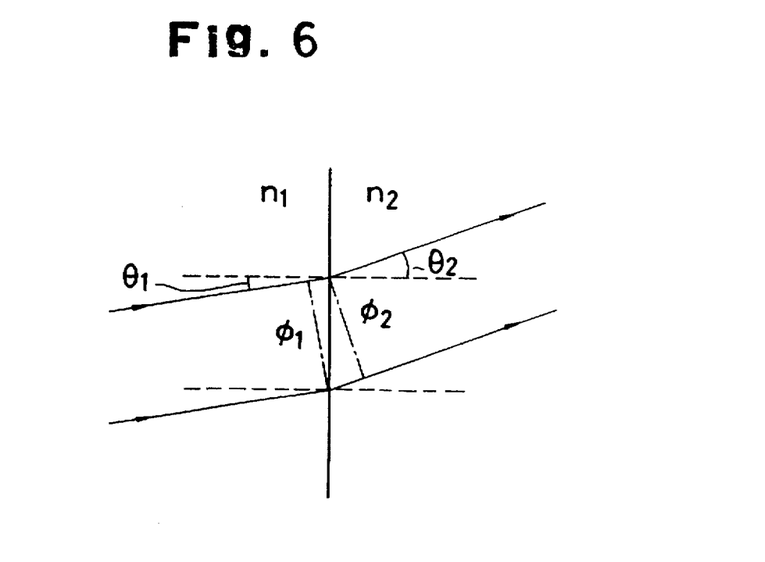
FIGS. 6 through 8 are explanatory views of operations of the light gathering prism shown in FIG. 5.

FIG. 6 shows the principle of refraction of a light flux at a boundary surface between two media having different refractive indexes.

Supposing that the refractive indexes of a first medium on the incident side and a second medium on the emission side are $n_1$, and $n_2$, respectively, we have the following equation:

$$n_1 \cdot \sin\theta 1 = n_2 \cdot \sin\theta 2 \qquad (1)$$

wherein $\theta 1$ is the incident angle, and $\theta 2$ is the angle of refraction.

When it is supposed that the diameters of the incident luminous flux (light flux) and the outgoing luminous flux are $\phi 1$ and $\phi 2$, respectively, a magnification m of a change in diameter of the luminous flux by refraction is obtained by:

$$\begin{aligned} m &= \phi 2/\phi 1 \qquad (2) \\ &= \cos\theta 2/\cos\theta 1 \\ &= [\{1-(n_1/n_2)^2 \cdot \sin^2\theta_1\}/(1-\sin^2\theta_1)]^{1/2} \end{aligned}$$

To satisfy m<1, the value of $n_1$ must be larger than the value of $n_2$. That is, $n_1 > n_2$.

Figure 7:
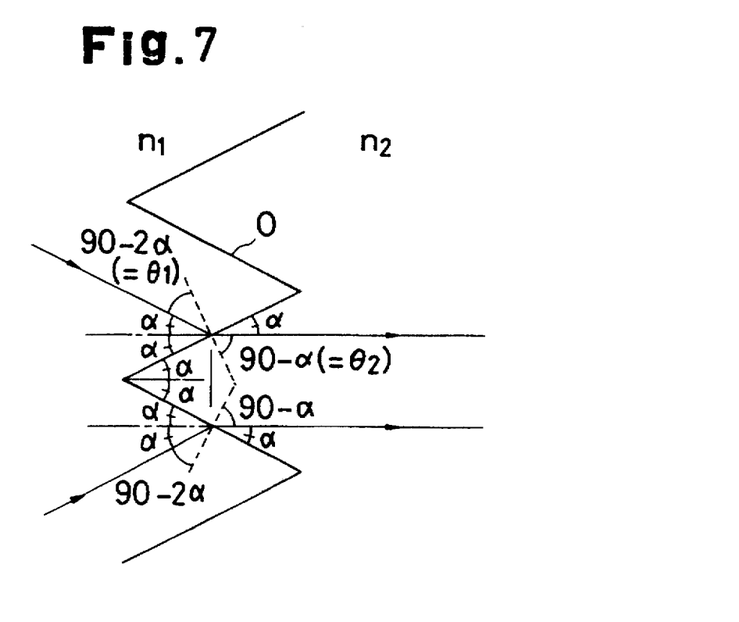

FIG. 7 shows a refraction at the boundary surfaces O of the triangular posts 40b. In FIG. 7, the apex angle of the triangular posts 40b is 2α, and the surface perpendicular to the bisector of the apex angle constitutes the reference surface S, similarly to the first embodiment.

To eliminate the vignetting of the light flux, the incident angle θ1 and the angle θ2 of refraction at the boundary surface O must satisfy the following formulae, respectively.

$$\theta_1 = 90 - 2\alpha, \theta_2 = 90 - \alpha$$

Then, the equation (1) mentioned above can be replaced with the following equation:

$$n_1 \cdot \cos 2\alpha = n_2 \cdot \cos \alpha$$

From this equation, we have:

$$\cos \alpha = \{1 + [1 + 8(n_1/n_2)^2]^{1/2}\}/\{4 \cdot n_1/n_2\} \quad (3)$$

And;

$$m = \cos \theta_2/\cos \theta_1 = \sin \alpha/\sin 2\alpha = 1/(2 \cos \alpha) \quad (4)$$

Figure 8:
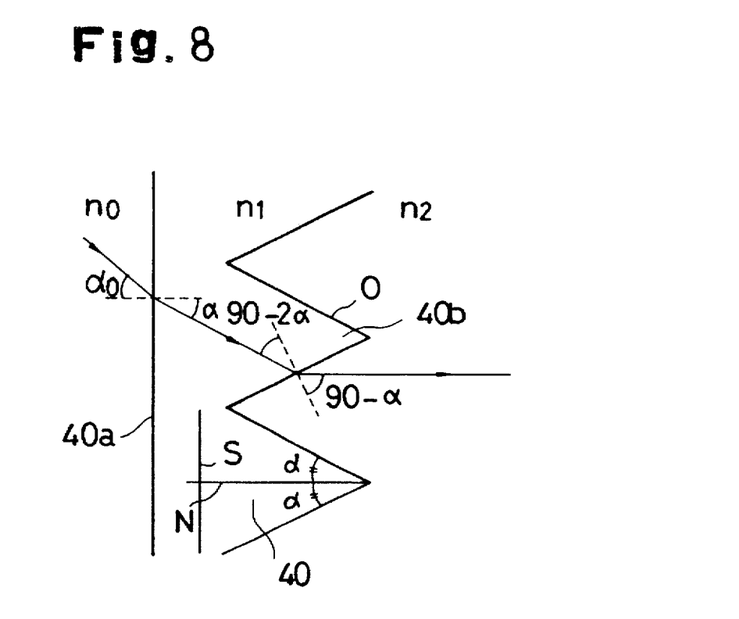

The operation of the composite prism 40 is as follows (FIG. 8).

At the boundary surface 40a (reference surface S) of the incident side, the following formula is satisfied;

$$n_0 \cdot \sin \alpha_0 = n_1 \cdot \sin \alpha \quad (5)$$

From the equations (2) and (4), the resultant magnification m' is given by;

$$m' = \{\cos \alpha/\cos \alpha_0\} \cdot \{\frac{1}{2} \cos \alpha\} = \frac{1}{2} \cos \alpha_0 \quad (6)$$

Thus, if the refractive indexes of three kinds of media are determined, the apex angle α, to prevent the occurrence of the vignetting, can be determined in accordance with the equation (3), whereby the incident angle α0 can be obtained by the equation (5).

Having obtained the value of $\alpha_0$, the resultant magnification m' can be determined by equation (6).

For example, when the composite prism 40 made of Bk7 ($n_1 = 1.51633$) is disposed in the air ($n_0 = n_2 = 1$);

α=27.008°

$\alpha_0$=43.518° m'=0.690

When these requirements are satisfied, the light fluxes A and B from the different directions can be gathered and emitted in the direction.

Although the light flux emitted from the single light source is first split into two components so as to have the same polarization, and then, the split light fluxes are collected by the light gathering element, as in the illustrated embodiment, the present invention is not limited thereto. For instance, the present invention can be applied to a light gathering apparatus to gather two or more light fluxes having random Polarizations emitted from their respective separate light sources.

Figure 9:
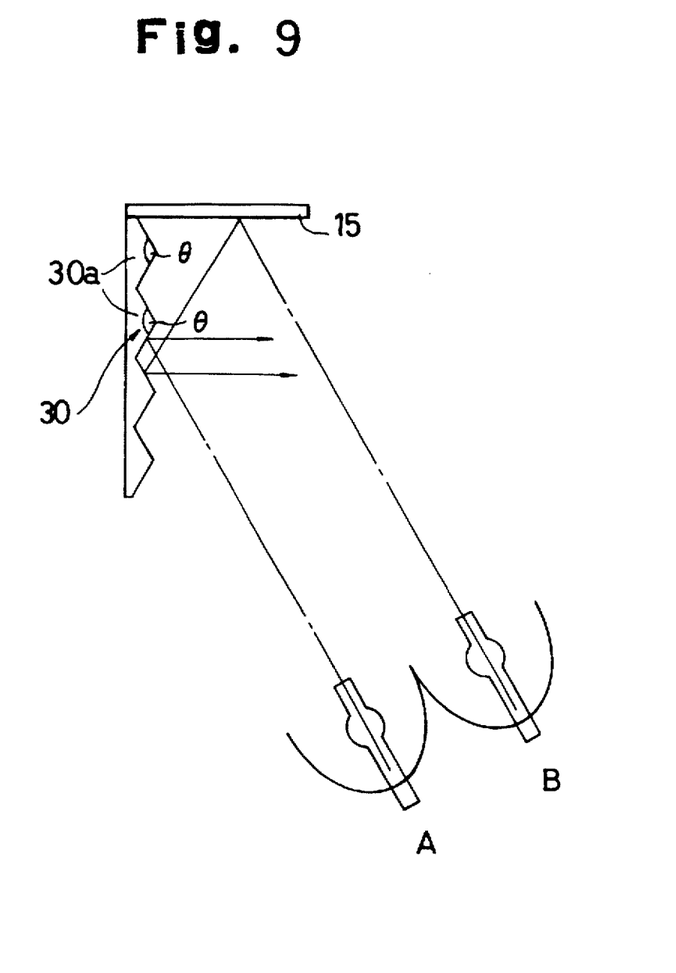
FIG. 9 is a schematic diagram showing an optical path of a light gathering apparatus according to a third embodiment of the present invention; and, FIG. 10 is a schematic diagram showing an optical path of a known light gathering apparatus.

FIG. 9 shows a third embodiment of the present invention in which the light source 10, collimating lens 11, polarization beam splitter 12, λ/2 plate 13 and mirror 14 are replaced by two lamps A and B which emit light fluxes of random polarization. The remaining construction is the same as in the first embodiment (see FIG.1). In this embodiment, the light flux incident from lamp A is immediately reflected by the light gathering mirror 30, whereas the light flux incident from lamp B is reflected first by mirror 15 and subsequently by light gathering mirror 30.

I claim:

1. A light gathering apparatus comprising:

means for generating at least two fluxes of light;

means for diverting at least one of said at least two fluxes of light to form at least two fluxes of light extending in different directions; and means for receiving and reflecting said at least two fluxes of light extending in different directions and for reflecting a combined parallel light flux comprising said at least two fluxes of light after changing the directions of said at least two fluxes of light so that said at least two fluxes of light extend in the same direction;

wherein said means for receiving and reflecting comprises an array of continuous first and second reflection mirror surfaces which are alternately and symmetrically arranged with respect to the bisector of an angle formed by an intersection of said at least two fluxes of light, said continuous first and second reflection mirror surfaces meeting at apex angles of 120 degrees.

2. A light gathering apparatus according to claim 1, wherein each of said at least two fluxes of light comprises a flux of light which is parallel.

3. A light gathering apparatus according to claim 2, wherein said means for diverting comprises a mirror which reflects one of said at least two fluxes of light, wherein said one light flux reflected by said mirror and at least one other light flux of different direction from said one light flux reflected by said mirror are made incident upon said means for receiving and reflecting.

4. A light gathering apparatus according to claim 3, wherein said means for diverting further comprises a polarization beam splitter onto which a collimated light flux is incident from a light source; a λ/2 plate through which the light flux is transmitted having passed through said polarization beam splitter, and an additional mirror which reflects the light flux reflected by said polarization beam splitter and directs the light flux reflected by said polarization beam splitter toward said mirror;

wherein the light flux passed through said polarization beam splitter and the light flux reflected by the mirrors comprise said at least two fluxes of light.

5. A light gathering apparatus according to claim 4, wherein said means for generating said at least two fluxes of light generate light fluxes of the same polarization.

6. A light gathering apparatus according to claim 4, wherein said at least two fluxes of light, upon being reflected by said receiving and reflecting means as said combined parallel light flux, have the same polarization.

7. A light gathering apparatus according to claim 3, wherein said means for generating generate light fluxes of random polarization.

8. A light gathering apparatus according to claim 7, wherein said means for generating comprise two lamps which emit light fluxes of random polarization.

9. A light gathering apparatus according to claim 2, wherein said means for receiving and reflecting further comprises a plurality of triangular posts, each having said first and second reflection surfaces.

10. A light generating apparatus according to claim 2, wherein said at least two fluxes of light are made incident upon said first and second reflection mirror surfaces at an incident angle of substantially 60 degrees with respect to said bisector of the angle.

11. A light gathering apparatus according to claim 1, wherein said means for generating said at least two fluxes of light generate light fluxes of the same polarization.

12. A light gathering apparatus according to claim 1, wherein said means for generating generate light fluxes of random polarization.

13. The light gathering apparatus according to claim 1, said receiving and reflecting means reflecting the combined parallel light flux without any loss of light.

* * * * *